United States Patent [19]

Desplanches et al.

[11] 4,211,570

[45] Jul. 8, 1980

[54] METHOD OF MANUFACTURING BETA ALKALINE ALUMINA PARTS

[75] Inventors: Gérard Desplanches, la Poitevine; Jacques Leboucq, Saint-Genevieve-des-Bois, both of France

[73] Assignee: Compagnie Generale d'Electricite, Paris, France

[21] Appl. No.: 22,768

[22] Filed: Mar. 22, 1979

[30] Foreign Application Priority Data

Mar. 31, 1978 [FR] France .................................. 78 09498
Jan. 29, 1979 [FR] France .................................. 79 02200

[51] Int. Cl.$^2$ ........................ C04B 35/02; C04B 35/10
[52] U.S. Cl. ........................................ 106/65; 106/73.4; 106/104; 264/65; 429/193
[58] Field of Search ................. 423/600; 106/65, 73.4, 106/64, 104; 264/65; 429/193

[56] References Cited

U.S. PATENT DOCUMENTS

| 4,056,589 | 11/1977 | Lingscheit ............................. 264/65 |
| 4,068,048 | 1/1978 | Desplanches et al. ............ 106/65 X |
| 4,102,695 | 7/1978 | Claverie ................................. 106/64 |

FOREIGN PATENT DOCUMENTS 7303362   9/1973   Netherlands ............................. 106/104

Primary Examiner—Helen M. McCarthy

Attorney, Agent, or Firm—Sughrue, Rothwell, Mion, Zinn and Macpeak

[57] ABSTRACT

A method of manufacturing beta alkaline alumina parts and in particular beta sodium alumina parts in which the following successive steps are carried out:

A. Alumina powder and an alkaline carbonate powder are intimately mixed together in quantities such that a predetermined ratio $Al_2O_3/Na_2O$ is obtained;
B. Said intimate mixture is heated in an open crucible;
C. Said mixture is allowed to cool freely;
D. The powder thus obtained is crushed;
E. Said parts are shaped; and
F. Said parts are sintered;

said parts being disposed for this purpose in a sintering chamber, which is at least partially made of a refractory material which includes a mixture of three ingredients, namely beta alumina fire clay obtained by melting and crushing into grains with a grain size of about 0.5 mm, beta alumina cement or binding agent obtained from an alpha alumina and sodium carbonate mixture by reaction in the solid state and at a temperature of about 1200° C., such a cement having a grain size of about 10 microns and lastly a sodium salt, the respective proportions by weight of these three ingredients being such that during sintering said chamber generates an atmosphere rich in sodium in the immediate vicinity of the parts.

13 Claims, 4 Drawing Figures

METHOD OF MANUFACTURING BETA ALKALINE ALUMINA PARTS

The present invention relates to a method of manufacturing beta alkaline alumina parts and more particularly of beta sodium alumina parts.

It is known that beta alkaline alumina and in particular beta sodium alumina is now greatly used as a solid electrolyte in electric cells such as sodium-sulphur cells.

In French patent application No. 23 97 376 published Feb. 23, 1979 for a "Method of manufacturing beta alumina parts", the applicant describes a method which includes the following successive steps:

(A) Alumina powder and an alkaline carbonate powder are intimately mixed together in quantities such that a predetermined ratio $Al_2O_3/Na_2O$ is obtained;

(B) Said intimate mixture is heated in an open crucible;

(C) Said mixture is allowed to cool freely;

(D) The powder thus obtained is crushed;

(E) Said parts are shaped; and (F) Said parts are sintered;

said method being characterized in that said parts are sintered in a sintering chamber made of a refractory material, preferably concrete, the inside of said chamber being at least partially coated with a layer of beta alkaline alumina which has substantially the same composition as that of the parts, an atmosphere rich in sodium being generated by said layer in the immediate vicinity of the parts during sintering, said parts also being sintered by heating said chamber to a temperature which lies between 1600° and 1700° C. maintained for 30 minutes to 4 hours then allowing the chamber to cool down to ambient temperature.

In particular, such a method allows the production of parts whose properties are very reproducible even from one sinter batch to another, while reducing to a minimum the losses of sodium from the parts while they are being sintered.

The Applicant has endeavoured to improve such a method while retaining and even increasing the previously acquired advantages.

The Applicant has found that the sintering chambers used in the method in accordance with the present invention allow a further reduction in the losses of sodium from the parts until these losses are virtually zero.

Further, such chambers have longer service life and they are also practically undeformable even after a great number of sintering operations.

Also, the cost price of these chambers is moderate.

The invention therefore provides a method of manufacturing beta alkaline alumina parts and in particular beta sodium alumina parts in which the following successive steps are carried out:

(A) Alumina powder and an alkaline carbonate powder are intimately mixed together in quantities such that a predetermined ratio $Al_2O_3/Na_2O$ is obtained;

(B) Said intimate mixture is heated in an open crucible;

(C) Said mixture is allowed to cool freely;

(D) The powder thus obtained is crushed;

(E) Said parts are shaped; and (F) Said parts are sintered;

said parts being disposed for this purpose in a sintering chamber, which is at least partially made of a refractory material which includes a mixture of three ingredients, namely beta alumina fire clay obtained by melting and crushing into grains with a grain size of about 0.5 mm; beta alumina cement or binding agent obtained from an alpha alumina and sodium carbonate mixture by reaction in the solid state and at a temperature of about 1200° C., such a cement having a grain size of about 10 microns and lastly a sodium salt, the respective proportions by weight of these three ingredients being such that during sintering, said chamber generates an atmosphere rich in sodium in the immediate vicinity of the parts.

According to a first embodiment, said chamber is made entirely of said refractory material.

According to another embodiment, said chamber is made of concrete and its inner surface is coated with a layer of said refractory material.

Examples of the invention are described by way of example, with reference to the accompanying drawings, in which.

Firstly, alpha or gamma alumina powder and sodium carbonate powder are intimately mixed together in quantities such that beta alumina $xAl_2O_3$, $Na_2O$ is obtained, where x lies between 5 and 11.

Such a mixture is disposed in an open crucible is that the reaction takes place in a non-confined atmosphere.

Said crucible is inserted in a furnace and brought to a temperature which lies between 1150° and 1300°, e.g. 1200° C., and maintained for example for 1 to 5 hours.

At the end of the heating time, the crucible is allowed to cool freely. Beta sodium alumina is obtained in powdered form by crushing for about 2 hours.

The parts are then shaped in particular into tubes e.g. by electrophoresis or by isostatic compression.

Sintering is then carried out in accordance with one of the following realisations of the present invention.

FIRST REALISATION

Figure 1:
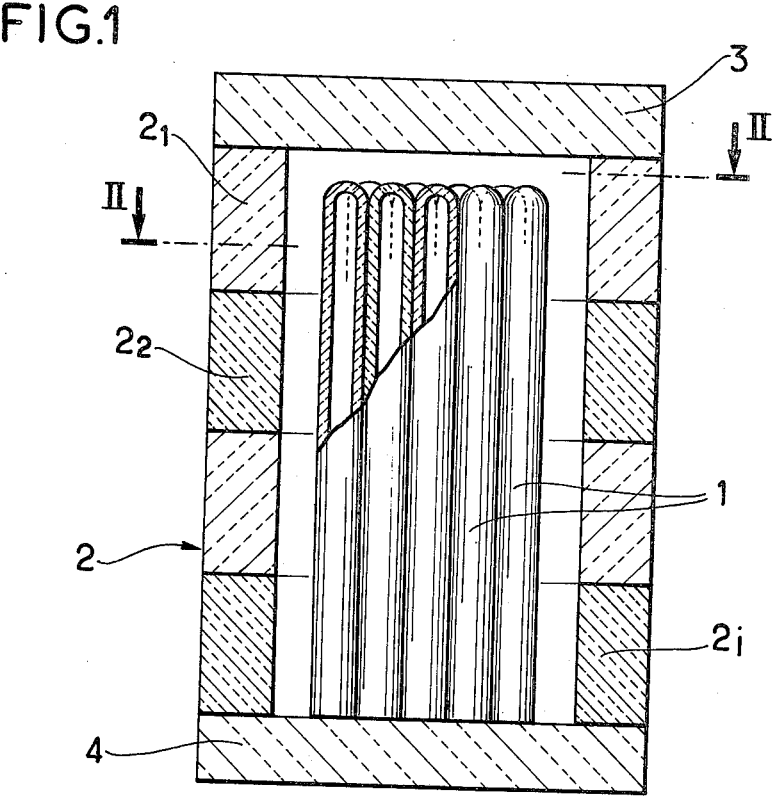
FIG. 1 illustrates a longitudinal cross-section of a sintering chamber for use in a first realisation of the method of the invention.
Figure 2:
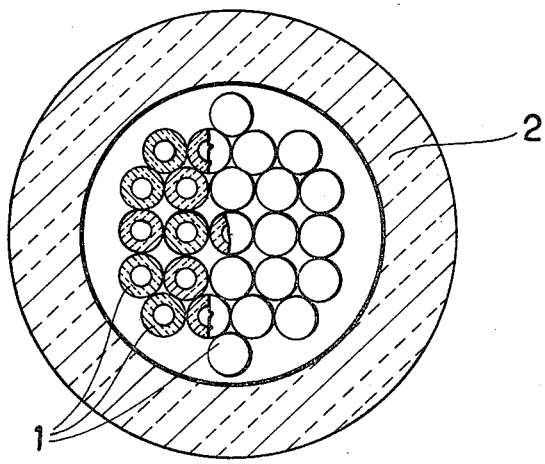
FIG. 2 illustrates a cross-section along the axis II—II of FIG. 1.

With reference to FIGS. 1 and 2, the beta sodium alumina tubes 1 shaped as previously described are placed in a sintering chamber which, in accordance with this realisation of the invention, includes a tubular body 2 made of a refractory material such as described hereinafter, closed at its ends by an upper plate 3 and a lower plate 4.

The body 2 is made of several fairly short components $2_1$, $2_2$, $2_i$ which are easily interchangeable and which can be stacked on one another.

Of course, the body 2 could be made in a single piece. In accordance with the invention, these components $2_1$, $2_2$, $2_i$ are prepared as follows:

There is formed, preferably in an aqueous medium, a mixture of 3 ingredients, namely:

beta alumina fire clay obtained by melting and crushed into grains with a grain size of 0.5 to 5 mm;

beta alumina cement or binding agent obtained from an alpha alumina and sodium carbonate mixture by reaction in the solid state and at a temperature of about 1200° C. Such a cement has a grain size of about ten microns; and a sodium salt such as the oxide or the carbonate, suitable for generating a sodium atmosphere inside the chamber and therefore for compensating possible sodium losses from the parts during sintering.

By way of example, the proportions of these components are, respectively, substantially as follows:

| Fire clay | | 75% |
|---|---|---|
| Cement | | 20% |
| Sodium salt | ($Na_2CO_3$) | 5% |

After mixing, the components are shaped then heated to about 80° C. to make the cement set. The whole is then baked at about 1200° C.

The chamber thus prepared is placed in a furnace where the parts 1, are disposed against one another, and are sintered.

For the purpose, the furnace is heated to a temperature of 1650° C. which is maintained for 1½ hours. Further, the duration can vary between 30 minutes and 4 hours and the temperature can vary between 1600° and 1700° C. It takes about 3 hours to reach such temperatures. Then the furnace is allowed to cool freely.

The parts 1 then shrink by about 15%.

SECOND REALISATION

Figure 3:
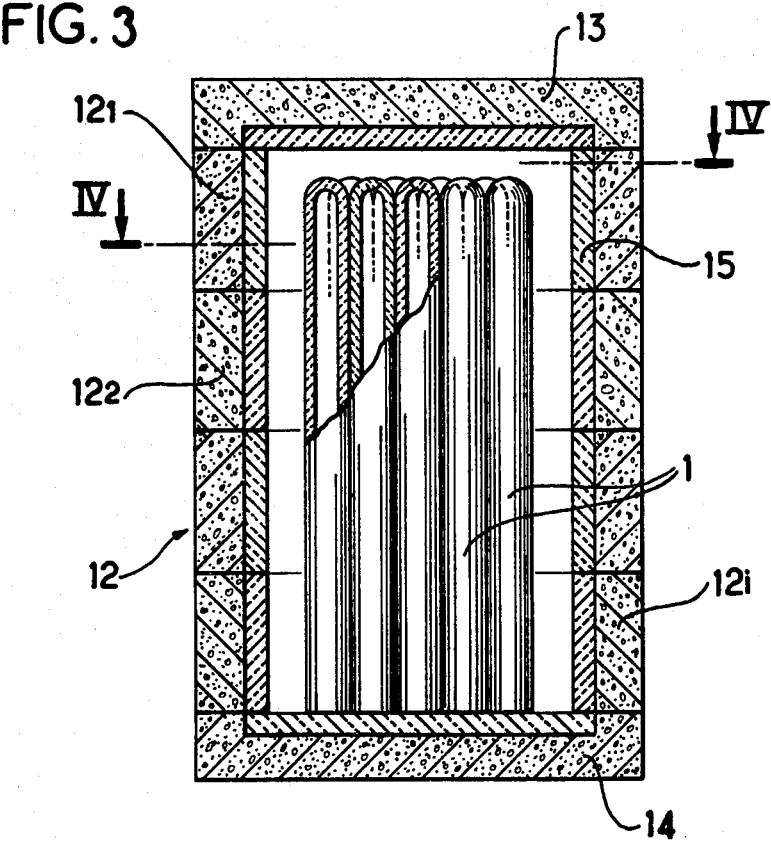
FIG. 3 illustrates a longitudinal cross-section of a sintering chamber for use in a second realisation of the method of the invention.
Figure 4:
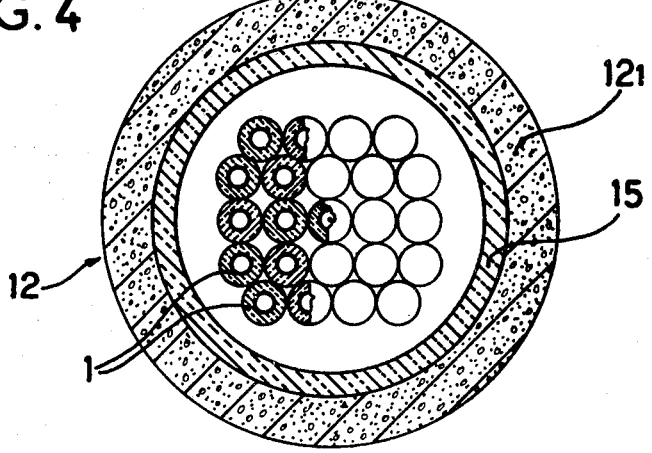
FIG. 4 illustrates a cross-section along the axis III—III of FIG. 3.

With reference to FIGS. 3 and 4, the beta sodium alumina tubes 1 shaped as previously described are placed in a sintering chamber which, in accordance with a second realisation of the invention, includes a tubular body 12 made of commercial concrete at one end by an upper plate 13 and at the other end by a lower plate 14.

The body 12 is made of several components $12_1$, $12_2$, $12_i$ which are easily interchangeable and whose lengths are limited. The components can be stacked on one another.

One variant consists in making said body 12 in a single piece.

Further these components (or the single piece which forms the body 12) are shaped using conventional technologies such as casting, uniaxial compression and ramming, in particular with chambers which have large dimensions.

Further, said components (or the single part which forms the body 12) as well as the plates 13 and 14, are coated on their inner surfaces with a layer or coating 15 of refractory material whose composition is analogous to that of the material used in said first embodiment and prepared in a similar way.

Such a coating 15 is preferably made by ramming damp paste.

The chamber is then placed in a furnace where the parts 1 are sintered in the conditions previously set forth.

A particular example of the invention will be given hereinafter.

The sintering chamber is 55 cm high and has an outer diameter of 25 cm. Its inside volume is about 20 dm$^3$ and may contain 30 tubes 1 which are 51 cm high and have an outer diameter of 3.5 cm.

The body 12 includes 10 components made of Purotab coarse type concrete supplied by Kaiser Electro Refractaire.

The layer 15 is about 7 mm thick and its composition is as described above.

Likewise, a chamber with equivalent dimensions can be made with the refractory material such as described with reference to FIGS. 1 and 2.

In this respect, it will be observed that after a number of sintering operations, the components $2_1$, $2_2$, ... $2_i$ of the chambers can be crushed into grains in which a sodium salt is again mixed so as to compensate the loss which is inevitable after a number of sintering operations. Therefore, the worn chambers are salvaged and this moderates the cost of sintering.

I claim:

1. In a method of manufacturing beta sodium alumina parts in which the following successive steps are carried out:
   A. alumina powder and an alkaline carbonate powder are intimately mixed together in quantities such that a predetermined ratio $Al_2O_3/Na_2O$ is obtained;
   B. said intimate mixture is heated in an open crucible;
   C. said mixture is allowed to cool freely;
   D. the powder thus obtained is crushed;
   E. said parts are shaped; and
   F. said parts are sintered; said parts being disposed for this purpose in a sintering chamber made of a refractory material with at least a portion of the inside of the chamber being constituted so as to generate an atmosphere rich in sodium in the immediate vicinity of the parts during sintering, the improvement wherein said chamber is at least partially made of a refractory material which consists essentially of a mixture of three ingredients, namely beta alumina fire clay obtained by melting and crushing into grains with a grain size of about 0.5 mm, beta alumina cement or binding agent obtained from an alpha alumina and sodium carbonate mixture by reaction in the solid state and at a temperature of about 1200° C., such a cement having a grain size of about 10 microns and lastly a sodium salt, the respective proportions by weight of these three ingredients being such that during sintering said chamber generates an atmosphere rich in sodium in the immediate vicinity of the parts.

2. A method according to claim 1, wherein said chamber is made entirely of said refractory material.

3. A method according to claim 2, wherein said three ingredients are mixed in an aqueous medium to form a cement from which the chamber is shaped, the cement is then made to set at a temperature of about 80° C., and then the contents of the furnace are baked at a temperature of about 1200° C.

4. A method according to claim 2 or 3, wherein the body of said chamber is made of several interchangeable components which are stacked on one another.

5. A method according to claim 1, wherein said chamber is made of concrete and its inner surface is coated with a layer of said refractory material.

6. A method according to claim 5, wherein said three ingredients are mixed in an aqueous medium, said layer is formed on the concrete, the cement is made to set at a temperature of about 80° C. and then the contents of the furnace are baked at a temperature of about 1200° C.

7. A method according to claim 5 or 6, wherein the body of said chamber is made in a single piece.

8. A method according to claim 1 or 2, wherein the proportions of the three ingredients are substantially: fire clay: 75%; cement: 20%; sodium salt: 5%.

9. A method according to claim 1 or 2, wherein said sintering chamber includes an upper plate and a lower plate which close the body of the chamber.

10. A method according to claim 1 or 2, wherein said parts are sintered by heating said chamber to a temperature which lies between 1600° C. and 1700° C. which is maintained for 30 minutes to 4 hours and by allowing the chamber to cool freely down to ambient temperature.

11. A method according to claim 1 or 2, wherein said ratio of $Al_2O_3/Na_2O$ lies between 5 and 11.

12. A method according to claim 1 or 2, wherein in step B, the crucible is heated to a temperature lying between 1150° and 1300° C. which is maintained for 1 to 5 hours.

13. A method according to claim 1 or 2, wherein in step E, the parts are shaped by electrophoresis followed by an isostatic compression of the deposit thus obtained.

* * * * *